US012309091B2

(12) United States Patent
Ryu et al.

(10) Patent No.: US 12,309,091 B2
(45) Date of Patent: May 20, 2025

(54) SIDELINK DEMODULATION REFERENCE SIGNAL (DMRS) BUNDLING TRIGGER

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Xiaojie Wang, Hillsborough, NJ (US); Peter Gaal, San Diego, CA (US); Juan Montojo, San Diego, CA (US); Wooseok Nam, San Diego, CA (US); Xiaoxia Zhang, San Diego, CA (US); Jing Sun, San Diego, CA (US); Mahmoud Taherzadeh Boroujeni, San Diego, CA (US); Piyush Gupta, Bridgewater, NJ (US); Lik Hang Silas Fong, Bridgewater, NJ (US); Hua Wang, Basking Ridge, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 17/449,083

(22) Filed: Sep. 27, 2021

(65) Prior Publication Data

US 2023/0096255 A1 Mar. 30, 2023

(51) Int. Cl.
*H04L 5/00* (2006.01)
*H04W 92/18* (2009.01)

(52) U.S. Cl.
CPC .......... *H04L 5/0051* (2013.01); *H04W 92/18* (2013.01)

(58) Field of Classification Search
CPC ... H04L 5/0051; H04L 25/0202; H04W 92/18
See application file for complete search history.

(56) References Cited

U.S. PATENT DOCUMENTS

| 2018/0123741 | A1* | 5/2018 | You | H04L 5/0055 |
| 2019/0159181 | A1* | 5/2019 | Manolakos | H04B 7/086 |
| 2019/0306908 | A1* | 10/2019 | Hahn | H04W 76/38 |
| 2019/0319757 | A1* | 10/2019 | Manolakos | H04L 1/0003 |

(Continued)

FOREIGN PATENT DOCUMENTS

| WO | WO-2020259811 A1 * | 12/2020 | |
| WO | WO-2021173859 A1 * | 9/2021 | H04L 5/0051 |

*Primary Examiner* — Jackie Zuniga Abad
*Assistant Examiner* — Latresa A McCallum
(74) *Attorney, Agent, or Firm* — Norton Rose Fulbright US LLP

(57) ABSTRACT

Systems, methods, and devices for wireless communication that support mechanisms for enabling sidelink demodulation reference signal (DMRS) bundling in a wireless communication system. In aspects, a transmitting user equipment (UE) may be configured for sidelink communication with a receiving UE, and a sidelink DMRS transmission may be determined to be transmitted from the transmitting UE to the receiving UE. In aspects, determining whether to enable bundling of the sidelink DMRS transmission from the transmitting UE to the receiving UE or not (e.g., whether to enable or to forego enabling bundling of the sidelink DMRS transmission) may be determined in accordance with various aspects of the present disclosure.

17 Claims, 8 Drawing Sheets

(56) References Cited

U.S. PATENT DOCUMENTS

| | | | |
|---|---|---|---|
| 2020/0007297 A1* | 1/2020 | Hong | H04W 28/04 |
| 2020/0106590 A1* | 4/2020 | Bharadwaj | H04L 27/2602 |
| 2020/0322932 A1* | 10/2020 | Kim | H04B 7/0695 |
| 2021/0067290 A1 | 3/2021 | Chen et al. | |
| 2021/0105117 A1* | 4/2021 | Abdelghaffar | H04L 27/2613 |
| 2021/0235420 A1* | 7/2021 | Kim | H04L 1/1812 |
| 2022/0271886 A1* | 8/2022 | He | H04L 5/0048 |
| 2022/0407645 A1 | 12/2022 | Wang et al. | |
| 2022/0416978 A1* | 12/2022 | Kalbasi | H04L 5/0053 |
| 2023/0044215 A1 | 2/2023 | Wang et al. | |
| 2023/0055114 A1 | 2/2023 | Ryu et al. | |
| 2023/0073421 A1 | 3/2023 | Ryu et al. | |
| 2023/0078193 A1 | 3/2023 | Fong et al. | |
| 2023/0101476 A1 | 3/2023 | Ryu et al. | |
| 2023/0291523 A1* | 9/2023 | Hasegawa | H04L 5/0094 |
| 2024/0031095 A1* | 1/2024 | Sun | H04L 25/0224 |

\* cited by examiner

SIDELINK DEMODULATION REFERENCE SIGNAL (DMRS) BUNDLING TRIGGER

TECHNICAL FIELD

Aspects of the present disclosure relate generally to wireless communication systems, and more particularly, to triggering sidelink demodulation reference signal (DMRS) bundling in a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes determining whether to enable bundling of a sidelink demodulation reference signal (DMRS) transmission to be transmitted to another UE over a sidelink, and transmitting, in response to a determination to enable bundling of the sidelink DMRS transmission, the bundled sidelink DMRS transmission to the another UE.

In an additional aspect of the disclosure, a method of wireless communication performed by a UE includes determining whether to enable bundling of a sidelink DMRS transmission to be transmitted from another UE to the UE over a sidelink, and receiving, in response to a determination to enable bundling of the sidelink DMRS transmission, the bundled sidelink DMRS transmission from the another UE.

In an additional aspect of the disclosure, a method of wireless communication performed by a base station includes receiving a first uplink transmission from a UE in sidelink communication with a second UE, and a second uplink transmission from the second UE, determining whether to enable bundling of a sidelink DMRS transmission to be transmitted from the first UE to the second UE over a sidelink, and transmitting, based on a determination to enable bundling of the sidelink DMRS transmission, an indication to the first UE to bundle the sidelink DMRS transmission to the second UE.

In an additional aspect of the disclosure, a UE includes at least one processor and a memory coupled to the at least one processor. The at least one processor stores processor-readable code that, when executed by the at least one processor, is configured to perform operations including determining whether to enable bundling of a sidelink DMRS transmission to be transmitted to another UE over a sidelink, and transmitting, in response to a determination to enable bundling of the sidelink DMRS transmission, the bundled sidelink DMRS transmission to the another UE.

In an additional aspect of the disclosure, a UE includes at least one processor and a memory coupled to the at least one processor. The at least one processor stores processor-readable code that, when executed by the at least one processor, is configured to perform operations including determining whether to enable bundling of a sidelink DMRS transmission to be transmitted from another UE to the UE over a sidelink, and receiving, in response to a determination to enable bundling of the sidelink DMRS transmission, the bundled sidelink DMRS transmission from the another UE.

In an additional aspect of the disclosure, a base station includes at least one processor and a memory coupled to the at least one processor. The at least one processor stores processor-readable code that, when executed by the at least one processor, is configured to perform operations including receiving a first uplink transmission from a UE in sidelink communication with a second UE, and a second uplink transmission from the second UE, determining whether to enable bundling of a sidelink DMRS transmission to be transmitted from the first UE to the second UE over a sidelink, and transmitting, based on a determination to enable bundling of the sidelink DMRS transmission, an indication to the first UE to bundle the sidelink DMRS transmission to the second UE.

In an additional aspect of the disclosure, a non-transitory computer-readable medium stores instructions that, when executed by a processor, cause the processor to perform operations. The operations include determining, by a UE, whether to enable bundling of a sidelink DMRS transmission to be transmitted to another UE over a sidelink, and transmitting, in response to a determination to enable bundling of the sidelink DMRS transmission, the bundled sidelink DMRS transmission to the another UE.

In an additional aspect of the disclosure, a non-transitory computer-readable medium stores instructions that, when executed by a processor, cause the processor to perform operations. The operations include determining, by a UE, whether to enable bundling of a sidelink DMRS transmission to be transmitted from another UE to the UE over a sidelink, and receiving, in response to a determination to enable bundling of the sidelink DMRS transmission, the bundled sidelink DMRS transmission from the another UE.

In an additional aspect of the disclosure, a non-transitory computer-readable medium stores instructions that, when executed by a processor, cause the processor to perform operations. The operations include receiving, by a base station, a first uplink transmission from a UE in sidelink communication with a second UE, and a second uplink transmission from the second UE, determining, by the base station, whether to enable bundling of a sidelink DMRS transmission to be transmitted from the first UE to the second UE over a sidelink, and transmitting, based on a determination to enable bundling of the sidelink DMRS transmission, an indication to the first UE to bundle the sidelink DMRS transmission to the second UE.

In an additional aspect of the disclosure, an apparatus includes means for determining, by a UE, whether to enable bundling of a sidelink DMRS transmission to be transmitted to another UE over a sidelink, and means for transmitting, in response to a determination to enable bundling of the sidelink DMRS transmission, the bundled sidelink DMRS transmission to the another UE.

In an additional aspect of the disclosure, an apparatus includes means for determining, by a UE, whether to enable bundling of a sidelink DMRS transmission to be transmitted from another UE to the UE over a sidelink, and means for receiving, in response to a determination to enable bundling of the sidelink DMRS transmission, the bundled sidelink DMRS transmission from the another UE.

In an additional aspect of the disclosure, an apparatus includes means for receiving, by a base station, a first uplink transmission from a UE in sidelink communication with a second UE, and a second uplink transmission from the second UE, means for determining, by the base station, whether to enable bundling of a sidelink DMRS transmission to be transmitted from the first UE to the second UE over a sidelink, and means for transmitting, based on a determination to enable bundling of the sidelink DMRS transmission, an indication to the first UE to bundle the sidelink DMRS transmission to the second UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
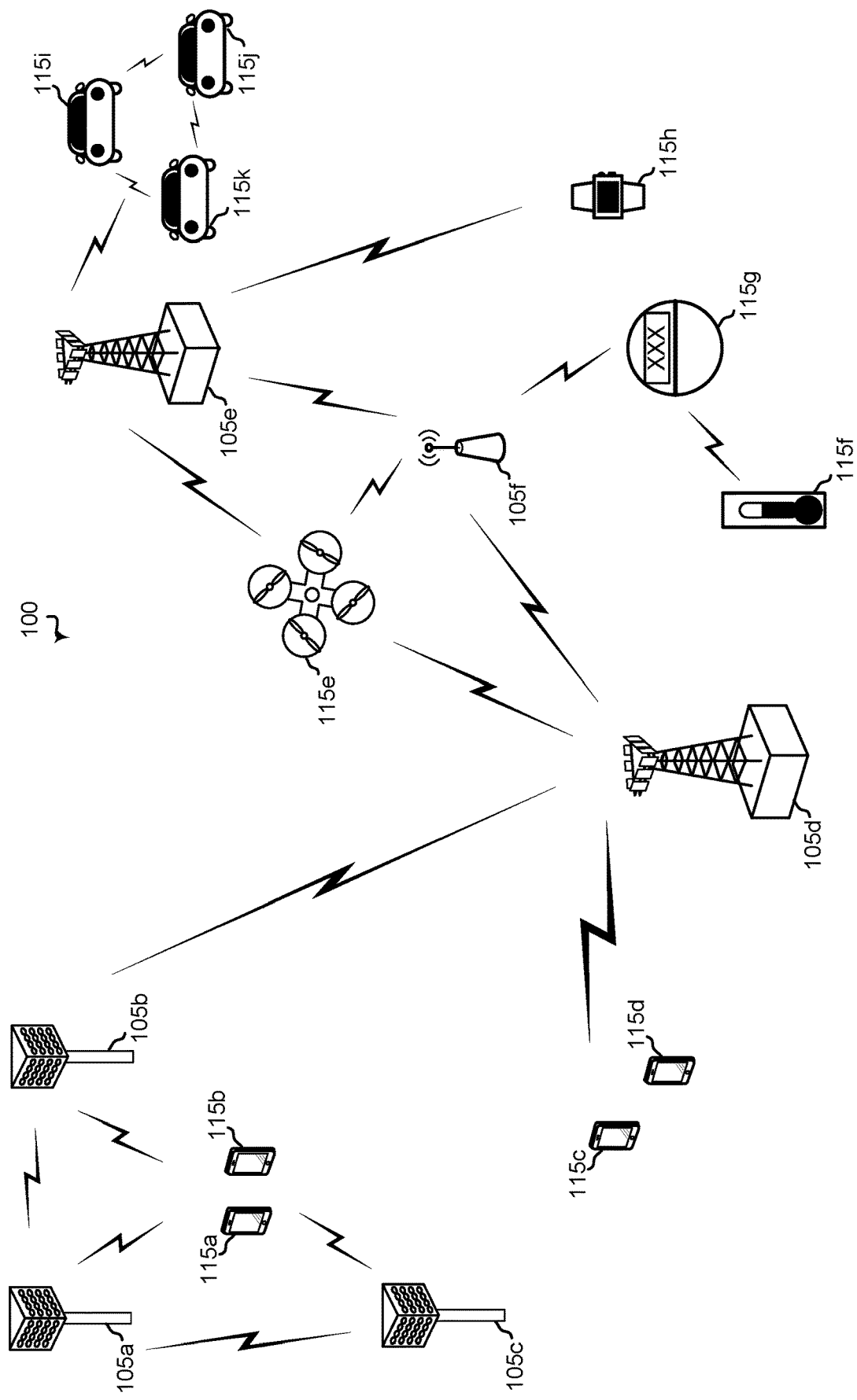
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
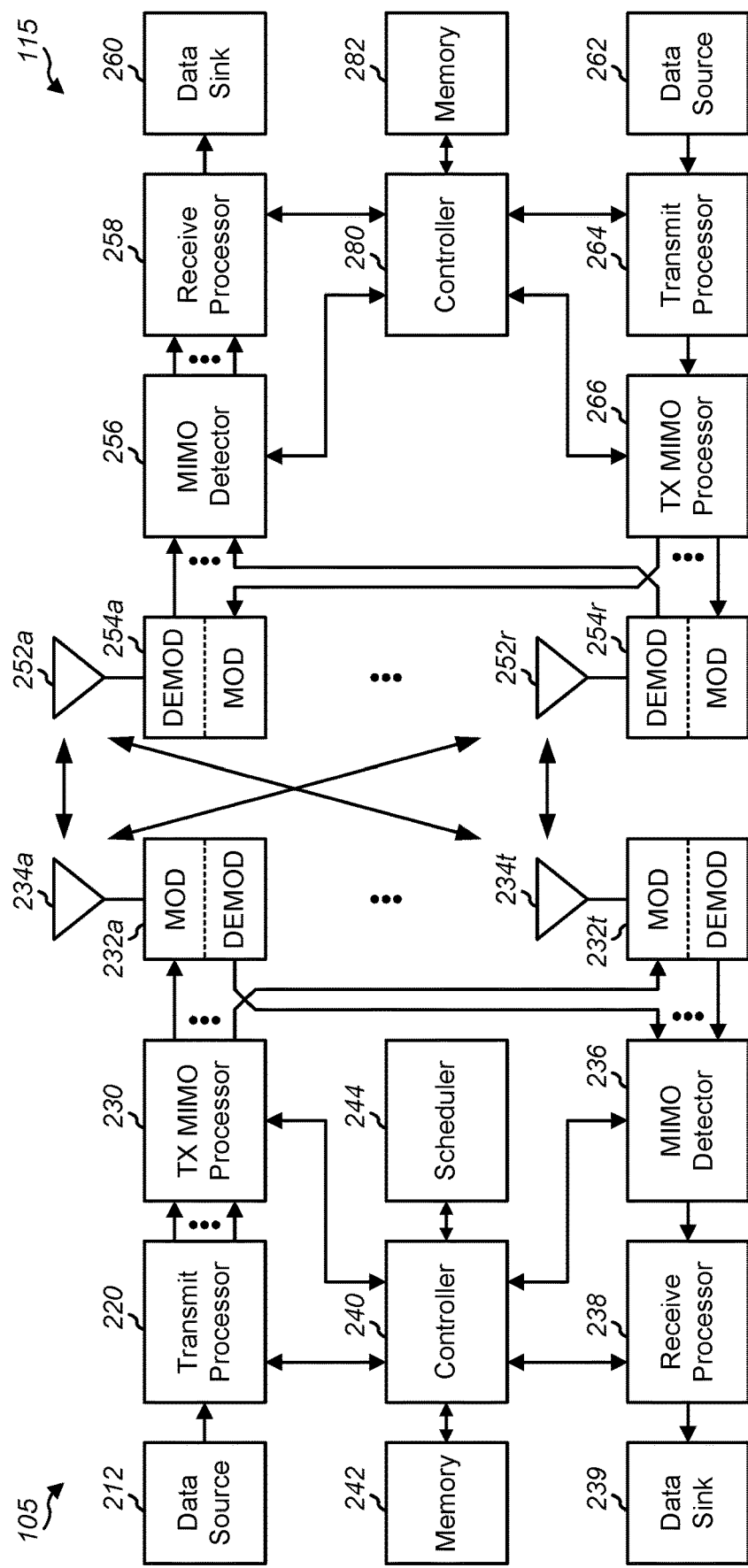
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4-6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems implement sidelink communications in which a UE communicates with other UEs directly over a sidelink. Sidelink communications transmission may follow a particular scheme, in which the transmitting UE may transmit control information in a sidelink control information (SCI) message (included in a physical sidelink control channel (PSCCH) transmission) to the receiving UE. The receiving UE may use the control information in the SCI to receive and/or to decode a data transmission (e.g., a physical sidelink shared channel (PSSCH) transmission) from the transmitting UE.

In current sidelink implementations, a sidelink demodulation reference signal (DMRS) may be transmitted in combination with PSCCH transmissions and/or the PSSCH transmissions. The sidelink DMRS may be transmitted from a transmitting UE to a receiving UE, and may enable and/or facilitate the receiving UE to perform channel estimation and to decode information. For example, the sidelink DMRS may be transmitted in a PSCCH transmission. In this case, the sidelink DMRS may be included in every PSCCH symbol and may be placed in a pattern that includes every fourth resource element (RE). The sidelink DMRS in the PSCCH may follow or be based on a Gold sequence. In another example, the sidelink DMRS may be transmitted in a PSSCH transmission. In this case, DMRS patterns that include two, three, and four symbol DMRS patterns maybe configured to be used by the transmitting UE. The transmitting UE may select a DMRS symbol pattern and may signal the selected DMRS symbol pattern to the receiving UE in the SCI message (e.g., in the SCSI or first-stage SCI). In some cases, a configuration type 1 may be used for frequency domain patterns to be used for DMRS in the PSSCH transmission. Sidelink DMRS configuration type 1 is a frequency domain DMRS pattern in which every other sub-carrier is a DMRS tone. The sidelink DMRS in the PSSCH may follow or be based on a Gold sequence.

In implementations, the sidelink DMRS transmissions may be bundled. Sidelink DMRS bundling may include a receiving UE performing joint channel estimation based on the sidelink DMRS transmissions received across multiple resources (e.g., slots) of a sidelink DMRS window, instead of performing channel estimation separately for each individual slot based on the sidelink DMRS transmission received over the individual slot. In this manner, a receiving UE may use the number of bundled sidelink DMRS transmissions, which may include sidelink DMRS transmissions over a plurality of slots or a sidelink DMRS bundling window, to better estimate the channel. Sidelink DMRS bundling may be useful in a situation in which the receive signal-to-noise ratio (SNR) may be too low to accurately estimate the channel using the sidelink DMRS transmitted in one slot. In this case, using the sidelink DMRS transmission of multiple slots may yield a more accurate estimate of the channel.

However, current implementations of sidelink DMRS bundling may only work if the channel to be estimated does not change over the plurality of slots over which the sidelink DMRS is bundled (e.g., the sidelink DMRS window). If the channel changes (e.g., if the channel is different in a first slot over which a DMRS is transmitted than in a second slot over which another DMRS is transmitted), then sidelink DMRS bundling does not work. As such, current implementations of sidelink DMRS bundling assume that the channel does not change within the sidelink DMRS bundling window. Because of this limitation, current implementations of sidelink DMRS bundling may be beneficial in low mobility scenarios where the sidelink channel changes slowly (e.g., due to low Doppler). However, current implementations of sidelink DMRS bundling with a multi-slot bundling window may not be as advantageous in a high mobility scenario (e.g., vehicle to everything (V2X)) due to the fact that the communication channel in this scenario may be fast changing (e.g., due to high Doppler).

One of the reasons that current implementations of sidelink DMRS bundling may not work on a changing channel may be due to the break in phase continuity. For example, suppose that a transmitting UE transmits a same OFDM symbol in two slots, $v_1(t)$ and $v_2(t)$. If the phase in $v_1(t)$ (e.g., $\phi_1$) is the same as the phase in $v_2(t)$ (e.g., $\phi_2$), then it is said that the transmitting UE maintains phase continuity over the transmission over the two slots $v_1(t)$ and $v_2(t)$. However, if the phase in $v_1(t)$ (e.g., $\phi_1$) is different from the phase in $v_2(t)$ (e.g., $\phi_2$), then it is said that the transmitting UE has experienced a phase jump of $\phi_2-\phi_1$ from slot $v_1(t)$ to slot $v_2(t)$. The phase jump of $\phi_2-\phi_1$ may not be known to either the transmitting UE or the receiving UE. The addition of the phase jump of $\phi_2-\phi_1$ either by the transmitting UE's RF hardware or the receiving UE's RF hardware causes the received signals $v1(t)$ and $v2(t)$ to be dissimilar, which may increase the complexity of the joint channel estimation algorithm using $v1(t)$ and $v2(t)$ without estimating the phase jump using phase jump reference signal.

In aspects, ensuring that DMRS bundling of a DMRS transmission is not affected by the phase jump problem described above may include ensuring that phase continuity is maintained (e.g., by the transmitting UE and/or the receiving UE) over the DMRS bundling window, and/or providing a phase jump reference signal that may be used to estimate a phase jump over the DMRS bundling window by the receiving UE. However, maintaining phase continuity may restrict what a UE is able to do. For example, a UE may not be able to change beams between two slots when phase continuity is to be maintained overt the two slots. As such, it is not always desirable to bundle a DMRS transmission. In addition, when a phase jump reference signal, the receiving UE may need to know that a phase jump reference signal is present in the bundled DMRS transmission.

Various aspects of the present disclosure are directed to systems and methods that support mechanisms for enabling sidelink DMRS bundling in a wireless communication system. In aspects, a transmitting UE may be configured for sidelink communication with a receiving UE, and a sidelink DMRS transmission may be determined to be transmitted from the transmitting UE to the receiving UE. In aspects, determining whether to enable bundling of the sidelink DMRS transmission from the transmitting UE to the receiving UE or not (e.g., whether to enable or to forego enabling bundling of the sidelink DMRS transmission) may be determined in accordance with various aspects of the present disclosure.

In aspects, bundling of the sidelink DMRS transmission may be enabled based on a mobility condition of the transmitting UE and/or the receiving UE. For example, the transmitting UE and/or the receiving UE may be determined to be in a high mobility condition, in which case bundling of the sidelink DMRS transmission may not be enabled. However, based on a determination that neither the transmitting UE nor the receiving UE are in a high mobility condition, bundling of the sidelink DMRS transmission may be enabled. In some aspects, bundling of the sidelink DMRS transmission may be enabled based on a determination that a prior bundled sidelink transmission (e.g., a prior bundled sidelink DMRS transmission) is transmitted from the receiving UE to the transmitting UE. For example, if the receiving UE transmits a bundled DMRS transmission to the transmitting UE, then the transmitting UE may determine to enable bundling of the DMRS transmission from the transmitting UE to the receiving UE. In some aspects, bundling of the sidelink DMRS transmission may be enabled based on a determination that both the transmitting UE and the receiving UE transmit bundled uplink transmissions to the base station. For example, if both the transmitting UE and the receiving UE transmit bundled Uu DMRS transmissions to the base station, then bundling of the sidelink DMRS transmission from the transmitting UE to the receiving UE may be enabled. In some aspects, bundling of the sidelink DMRS transmission from the transmitting UE to the receiving UE may be enabled based on a determination that the transmission resources over which the sidelink DMRS transmission is to be transmitted are consecutive resources.

Figure 3:
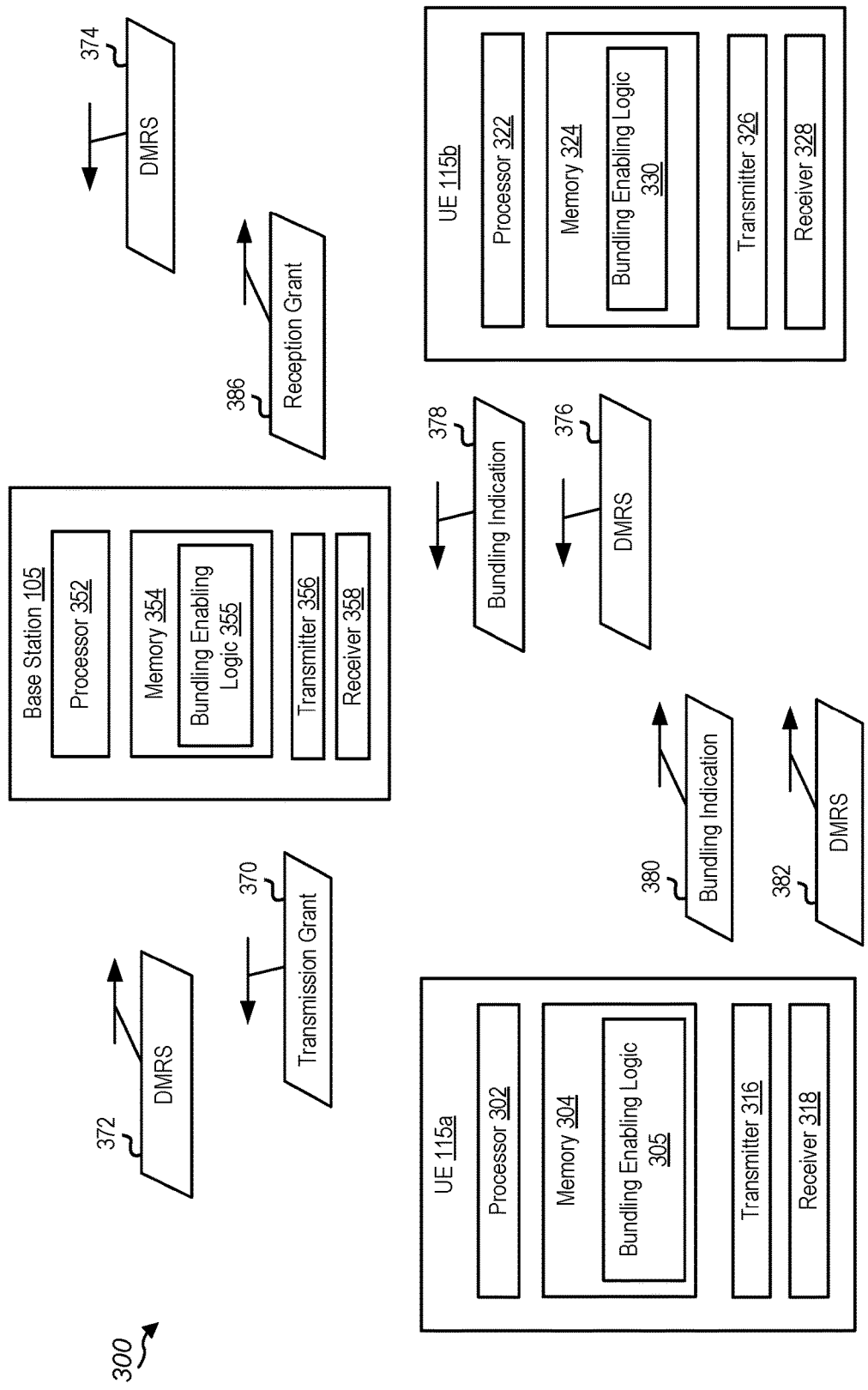
FIG. 3 is a block diagram illustrating an example wireless communication system that supports mechanisms for enabling sidelink demodulation reference signal (DMRS) bundling in a wireless communication system according to one or more aspects.

FIG. 3 is a block diagram of an example wireless communications system 300 that supports mechanisms for enabling sidelink DMRS bundling in a wireless communication system according to one or more aspects of the present disclosure. In some examples, wireless communications system 300 may implement aspects of wireless network 100. Wireless communications system 300 includes UE 115a, UE 115b, and base station 105, and may implement a sidelink communication scheme (e.g., sidelink mode 1 or sidelink mode 2). In aspects, UE 115*a* and UE 115*b* may be in communication over a sidelink. In some aspects, UE 115*a* and UE 115*b* may also each be in communication with base station 105, and may operate in sidelink mode 1. In the discussion that follows, UE 115*a* may be described as a transmitting UE and UE 115*b* may be described as a receiving UE, and in this context UE 115*a* may transmit data to UE 115*b* (e.g., SCI messages, bundled DMRS transmissions, PSCCH transmissions, PSSCH transmissions, etc.). However, this description of UE 115*a* as a transmitting UE and UE 115*b* as a receiving UE, as well as the description of system 300 as including two UEs and one base station, is merely for illustrative purposes and not intended to be limiting in any way. As such, wireless communications system 300 may generally include additional transmitting UEs and/or receiving UEs, and may include more than one base station 105.

UE 115*a* may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store bundling enabling logic 305. In aspects, bundling enabling logic 305 may be configured to perform operations for determining whether to enable bundling of the sidelink DMRS transmission from transmitting UE 115*a* to receiving UE 115*b* or not. For example, bundling enabling logic 305 may allow transmitting UE 115*a* to determine to enable, or to forego enabling, bundling of the sidelink DMRS transmission in accordance with the various techniques described herein.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

UE 115*b* also may include a variety of components (such as structural, hardware components) used for carrying out one or more functions described herein. For example, these components may include one or more processors 322 (hereinafter referred to collectively as "processor 322"), one or more memory devices 324 (hereinafter referred to collectively as "memory 324"), one or more transmitters 326 (hereinafter referred to collectively as "transmitter 326"), and one or more receivers 328 (hereinafter referred to collectively as "receiver 328"). Processor 322 may be configured to execute instructions stored in memory 324 to perform the operations described herein. In some implementations, processor 322 includes or corresponds to one or more of receive processor 258, transmit processor 264, and controller 280, and memory 324 includes or corresponds to memory 282.

Memory 324 includes or is configured to store bundling enabling logic 330. In aspects, bundling enabling logic 330 may be configured to perform operations for determining whether to enable bundling of the sidelink DMRS transmission from transmitting UE 115*a* to receiving UE 115*b* or not. For example, bundling enabling logic 330 may allow receiving UE 115*b* to determine to enable, or to forego enabling, bundling of the sidelink DMRS transmission in accordance with the various techniques described herein.

Transmitter 326 is configured to transmit reference signals, control information and data to one or more other devices, and receiver 328 is configured to receive references signals, synchronization signals, control information and data from one or more other devices. For example, transmitter 326 may transmit signaling, control information and data to, and receiver 328 may receive signaling, control information and data from, base station 105. In some implementations, transmitter 326 and receiver 328 may be integrated in one or more transceivers. Additionally or alternatively, transmitter 326 or receiver 328 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store bundling enabling logic 355. In aspects, bundling enabling logic 355 may be configured to perform operations for determining whether to enable bundling of the sidelink DMRS transmission from transmitting UE 115*a* to receiving UE 115*b* or not. For example, bundling enabling logic 355 may allow base station 105 to determine to enable, or to forego enabling, bundling of the sidelink DMRS transmission in accordance with the various techniques described herein.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, transmitting UE 115a may be scheduled to transmit sidelink DMRS transmission 382 to receiving UE 115b over the sidelink. A determination may be made as to whether to enable bundling of sidelink DMRS transmission 382 from transmitting UE 115a to receiving UE 115b or not.

In aspects, determining whether to enable bundling of sidelink DMRS transmission 382 from transmitting UE 115a to receiving UE 115b or not may be based on a mobility condition of the transmitting UE 115a and/or of the receiving UE 115b. For example, either transmitting UE 115a or receiving UE 115b may be in a high mobility condition. In a high mobility condition, sidelink DMRS bundling may not be beneficial, as the sidelink channel may change rapidly. Therefore, in the case where either transmitting UE 115a or receiving UE 115b may be in a high mobility condition, it may be determined that bundling of sidelink DMRS transmission 382 is not to be enabled.

In some aspects, transmitting UE 115a may determine, based on a detection motion (e.g., using mobility sensors), that transmitting UE 115a is in a high mobility condition. For example, transmitting UE 115a may compare the detected motion to a mobility threshold. Transmitting UE 115a may determine that it is in a high mobility condition based on a determination that the detected motion exceeds the mobility threshold. In this case, transmitting UE 115a may determine to forego enabling bundling of sidelink DMRS transmission 382 from transmitting UE 115a to receiving UE 115b. In some aspects, transmitting UE 115a may transmit bundling indication 380 to receiving UE 115b that sidelink DMRS transmission 382 is not bundled (or will not be bundled when bundling indication 380 is transmitted prior to sidelink DMRS transmission 382).

On the other hand, transmitting UE 115a may determine that it is not in a high mobility condition (e.g., may be in a low or medium mobility condition) based on a determination that the detected motion does not exceed the mobility threshold. In this case, transmitting UE 115a may determine to enable bundling of sidelink DMRS transmitted from transmitting UE 115a to receiving UE 115b. In some aspects, transmitting UE 115a may transmit bundling indication 380 to receiving UE 115b indicating that sidelink DMRS transmission 382 is bundled (or will be bundled when bundling indication 380 is transmitted prior to sidelink DMRS transmission 382).

In some aspects, receiving UE 115b may determine, based on a detection motion (e.g., using mobility sensors), that receiving UE 115b is in a high mobility condition. For example, receiving UE 115b may compare the detected motion to a mobility threshold. Receiving UE 115b may determine that it is in a high mobility condition based on a determination that the detected motion exceeds the mobility threshold. In this case, receiving UE 115b may determine to forego enabling bundling of sidelink DMRS transmission 382 from transmitting UE 115a to receiving UE 115b. In some aspects, receiving UE 115b may transmit bundling indication 378 to transmitting UE 115a, indicating to transmitting UE 115a that receiving UE 115b is in a high mobility condition, and/or requesting or instructing transmitting UE 115a to forego bundling sidelink DMRS transmission 382. In aspects, bundling indication 378 from receiving UE 115b may be included in a physical sidelink feedback channel (PSFCH) transmission to transmitting UE 115a, and/or may be included in an SCI message to be transmitted to transmitting UE 115a.

However, receiving UE 115b may determine that it is not in a high mobility condition (e.g., may be in a low or medium mobility condition) based on a determination that the detected motion does not exceed the mobility threshold. In this case, receiving UE 115b may determine to enable bundling of sidelink DMRS transmission 382 from transmitting UE 115a to receiving UE 115b. In some aspects, receiving UE 115b may transmit bundling indication 378 to transmitting UE 115a indicating to transmitting UE 115a that receiving UE 115b is not in a high mobility condition, and/or requesting or instructing transmitting UE 115a to bundle sidelink DMRS transmission 382.

In aspects, determining whether to enable bundling of sidelink DMRS transmission 382 from transmitting UE 115a to receiving UE 115b or not may be based on a determination that a prior bundled sidelink transmission (e.g., a prior bundled sidelink DMRS transmission) is transmitted from receiving UE 115b to transmitting UE 115a. For example, receiving UE 115b may transmit sidelink DMRS transmission 376 to transmitting UE 115a at a time prior to the determination by transmitting UE 115a whether to enable bundling of sidelink DMRS transmission 382 or not. Transmitting UE 115a may determine that sidelink DMRS transmission 376 is a bundled transmission. For example, transmitting UE 115a may determine that resources (e.g., slots) over which receiving UE 115b transmits over the sidelink to transmitting UE 115a include resources with bundled sidelink DMRS (e.g., sidelink DMRS transmission 376). In this case, based on the determination that receiving UE 115b transmits a bundled sidelink transmission prior to the determination by transmitting UE 115a whether to enable bundling of sidelink DMRS transmission 382 or not, transmitting UE 115a determines to enable bundling of sidelink DMRS transmission 382 from transmitting UE 115a to receiving UE 115b. In aspects, sidelink DMRS transmission 382 may be transmitted with a bundle configuration that is different from the bundle configuration of sidelink DMRS transmission 376.

However, transmitting UE 115a may determine that sidelink DMRS transmission 376 is not a bundled transmission. In this case, based on the determination that receiving UE 115b does not transmit a bundled sidelink transmission prior to the determination by transmitting UE 115a whether to enable bundling of sidelink DMRS transmission 382 or not, transmitting UE 115a determines to forego enabling bundling of sidelink DMRS transmission 382 from transmitting UE 115a to receiving UE 115b. In this manner, receiving UE 115b may enable or disable sidelink DMRS bundling by transmitting UE 115a by either transmitting a bundled sidelink DMRS transmission (e.g., to enable sidelink DMRS bundling) or transmitting an unbundled sidelink DMRS transmission (e.g., to disable sidelink DMRS bundling) to transmitting UE 115a.

In some aspects, transmitting UE 115a may determine to forego enabling bundling of sidelink DMRS transmission 382 from transmitting UE 115a to receiving UE 115b, even when determining that sidelink DMRS transmission 376 is a bundled transmission. In this case, receiving UE 115b may forego transmitting bundled sidelink DMRS transmissions in the future to transmitting UE 115a. In this manner, transmitting UE 115a may disable sidelink DMRS bundling at the receiving UE 115b by foregoing to transmit a bundled sidelink DMRS transmission to receiving UE 115b even when receiving UE 115b transmits a bundled sidelink DMRS transmission.

In aspects, determining whether to enable bundling of sidelink DMRS transmission 382 from transmitting UE 115a to receiving UE 115b or not may be based on a determination that transmitting UE 115a and receiving UE 115b transmit a bundled uplink transmission to base station 105. For example, transmitting UE 115a may transmit uplink DMRS transmission 372 to base station 105 over the access link (Uu). Similarly, receiving UE 115b may transmit uplink DMRS transmission 374 to base station 105 over the Uu. In aspects, determining whether to enable bundling of sidelink DMRS transmission 382 from transmitting UE 115a to receiving UE 115b or not may be based on a determination of whether both uplink DMRS transmission 372 from transmitting UE 115a and uplink DMRS transmission 374 from receiving UE 115b are bundled or not.

In aspects, base station 105 may determine to enable bundling of sidelink DMRS transmission 382 based on a determination that both uplink DMRS transmission 372 from transmitting UE 115a and uplink DMRS transmission 374 from receiving UE 115b are bundled DMRS transmissions. In this case, in some aspects, base station 105 may transmit an indication to transmitting UE 115a to bundle sidelink DMRS transmission 382. In aspects, the indication to transmitting UE 115a to bundle sidelink DMRS transmission 382 may be included in transmission grant 370 transmitted to transmitting UE 115a granting a sidelink transmission including sidelink DMRS transmission 382. In some aspects, base station 105 may not transmit an indication to transmitting UE 115a to bundle sidelink DMRS transmission 382. In these cases, enabling bundling of sidelink DMRS transmission 382 by transmitting UE 115a may be by default, and base station may instead transmit an indication when transmitting UE 115a is not to bundle sidelink DMRS transmission 382. In some aspects, base station 105 may transmit an indication to receiving UE 115b that transmitting UE 115a is to transmit a bundled sidelink DMRS transmission. In aspects, the indication to receiving UE 115b may be included in reception grant 386 transmitted to receiving UE 115b granting reception resources for receiving sidelink DMRS transmission 382.

In aspects, base station 105 may determine to forego enabling bundling of sidelink DMRS transmission 382 based on a determination that either uplink DMRS transmission 372 from transmitting UE 115a and uplink DMRS transmission 374 from receiving UE 115b are not bundled DMRS transmissions. In this case, in some aspects, base station 105 may transmit an indication (e.g., in transmission grant 370) to transmitting UE 115a to forego bundling sidelink DMRS transmission 382. Base station 105 may also transmit an indication (e.g., in reception grant 386) to receiving UE 115b that transmitting UE 115a is to transmit a sidelink DMRS transmission that is not bundled.

In aspects, determining whether to enable bundling of sidelink DMRS transmission 382 from transmitting UE 115a to receiving UE 115b or not may be based on a determination that the transmission resources over which the sidelink DMRS transmission is to be transmitted are consecutive resources. For example, transmitting UE 115a may determine to transmit sidelink DMRS transmissions over consecutive slots. In aspects, the consecutive slots may ne repetitions, or may include unique payloads. In either case, sidelink DMRS may be scheduled to be transmitted to receiving UE 115b over these consecutive slots. In these cases, transmitting UE 115a may determine, based on the determination that the transmission slots are consecutive slots, to enable bundling of the sidelink DMRS transmissions (e.g., sidelink DMRS transmission 382). In aspects, transmitting UE 115a may determine to enable bundling of the sidelink DMRS transmission over consecutive slots by default, without an indication from base station 105 or from receiving UE 115b. In aspects, when the transmission slots are not consecutive slots, transmitting UE 115a may determine to forego enabling bundling of the sidelink DMRS transmission, or may determine whether to enable bundling of the DMRS transmission based on the above described aspects.

During operation of wireless communications system 300, transmitting UE 115a may transmit sidelink DMRS transmission 382 to receiving UE 115b. In aspects, transmitting UE 115 may bundle sidelink DMRS transmission 382 based on a determination that bundling of sidelink DMRS transmission 382 is to be enabled (e.g., determination by transmitting UE 115a, an indication from base station 105, and/or an indication from receiving UE 115b) in accordance of aspects of the present disclosure. In some aspects, transmitting UE 115 may forego bundling sidelink DMRS transmission 382 based on a determination that bundling of sidelink DMRS transmission 382 is not to be enabled (e.g., determination by transmitting UE 115a, an indication from base station 105, and/or an indication from receiving UE 115b) in accordance of aspects of the present disclosure.

Figure 4:
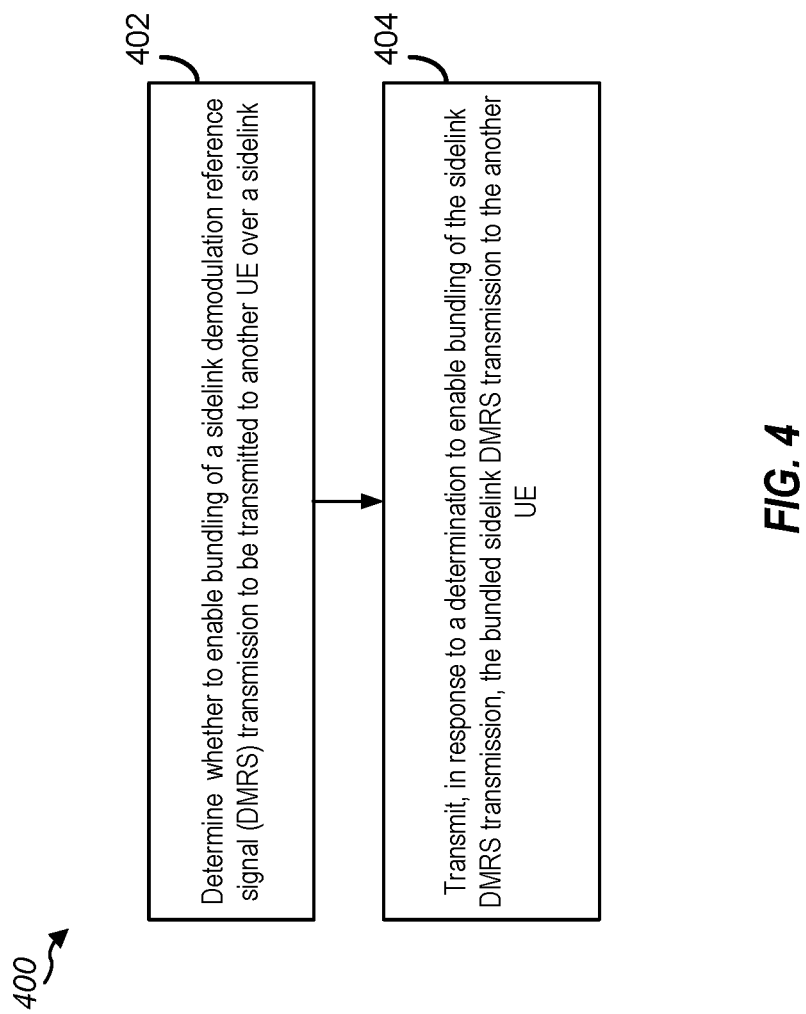
FIG. 4 is a flow diagram illustrating an example process that supports mechanisms for enabling sidelink DMRS bundling in a wireless communication system according to one or more aspects.
Figure 7:
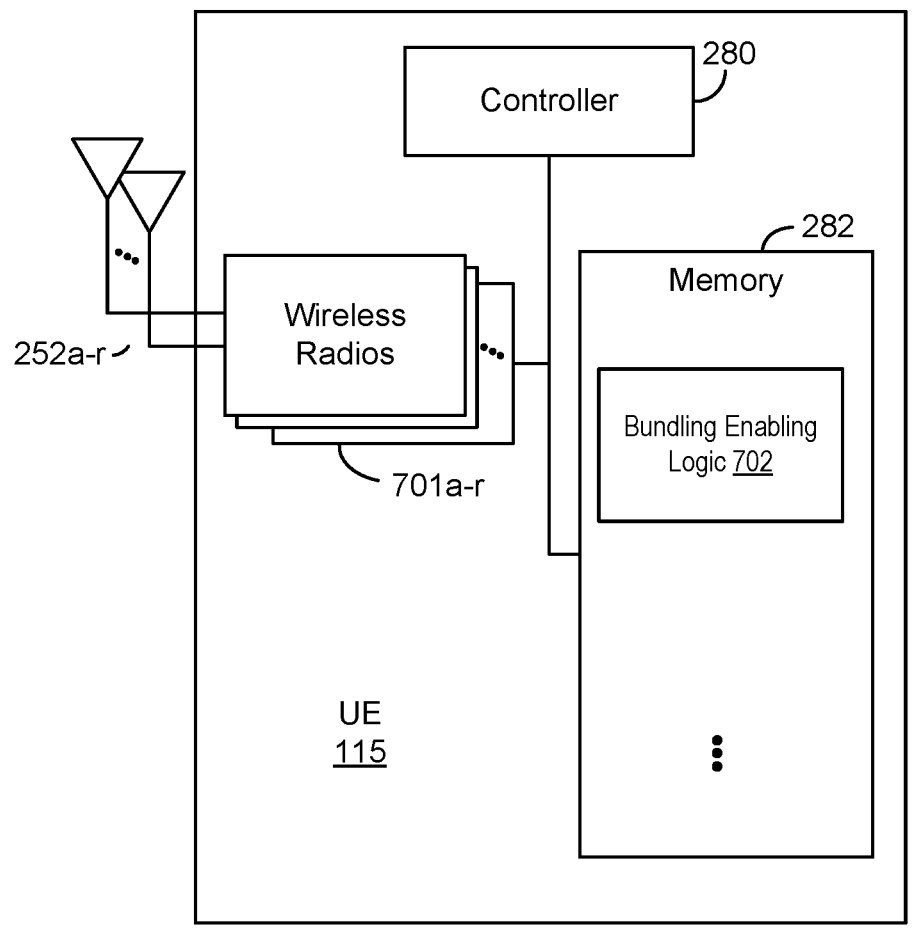
FIG. 7 is a block diagram of an example UE that supports mechanisms for enabling sidelink DMRS bundling in a wireless communication system according to one or more aspects.

FIG. 4 is a flow diagram illustrating an example process 400 that supports mechanisms for enabling sidelink DMRS bundling in a wireless communication system according to one or more aspects. Operations of process 400 may be performed by a UE, such as transmitting UE 115a described above with reference to FIGS. 1-3. For example, example operations (also referred to as "blocks") of process 400 may enable UE 115 to support mechanisms for enabling sidelink DMRS bundling. FIG. 7 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 701a-r and antennas 252a-r. Wireless radios 701a-r includes various components and hardware, as illustrated in FIG. 2, including modulator/demodulators 254a-r, MIMO detector 256, receive processor 258, transmit processor 264, and TX MIMO processor 266.

At block 402 of process 400, a UE (e.g., UE 115 and/or transmitting UE 115a) determines whether to enable bundling of a sidelink DMRS transmission to be transmitted to another UE over a sidelink. In order to implement the functionality for such operations, UE 115, under control of controller/processor 280, executes DMRS bundling enabling logic 802, stored in memory 282. The functionality implemented through the execution environment of DMRS bundling enabling logic 802 allows for UE 115 to perform operations for determining whether to enable bundling of a sidelink DMRS transmission to be transmitted to another UE over a sidelink according to the various aspects herein. In aspects, UE 115 may perform operations to determine whether to enable bundling of a sidelink DMRS transmission to be transmitted to another UE over a sidelink according to operations and functionality as described above with reference to transmitting UE 115a and as illustrated in FIG. 3.

At block 404 of process 400, UE 115 transmits, in response to a determination to enable bundling of the sidelink DMRS transmission, the bundled sidelink DMRS transmission to the another UE. In order to implement the functionality for such operations, UE 115, under control of controller/processor 280, may transmit, in response to a determination to enable bundling of the sidelink DMRS transmission, the bundled sidelink DMRS transmission to the another UE via wireless radios 701a-r and antennas 252a-r. In aspects, UE 115 may perform operations to transmit, in response to a determination to enable bundling of the sidelink DMRS transmission, the bundled sidelink DMRS transmission to the another UE according to operations and functionality as described above with reference to transmitting UE 115a and as illustrated in FIG. 3.

Figure 5:
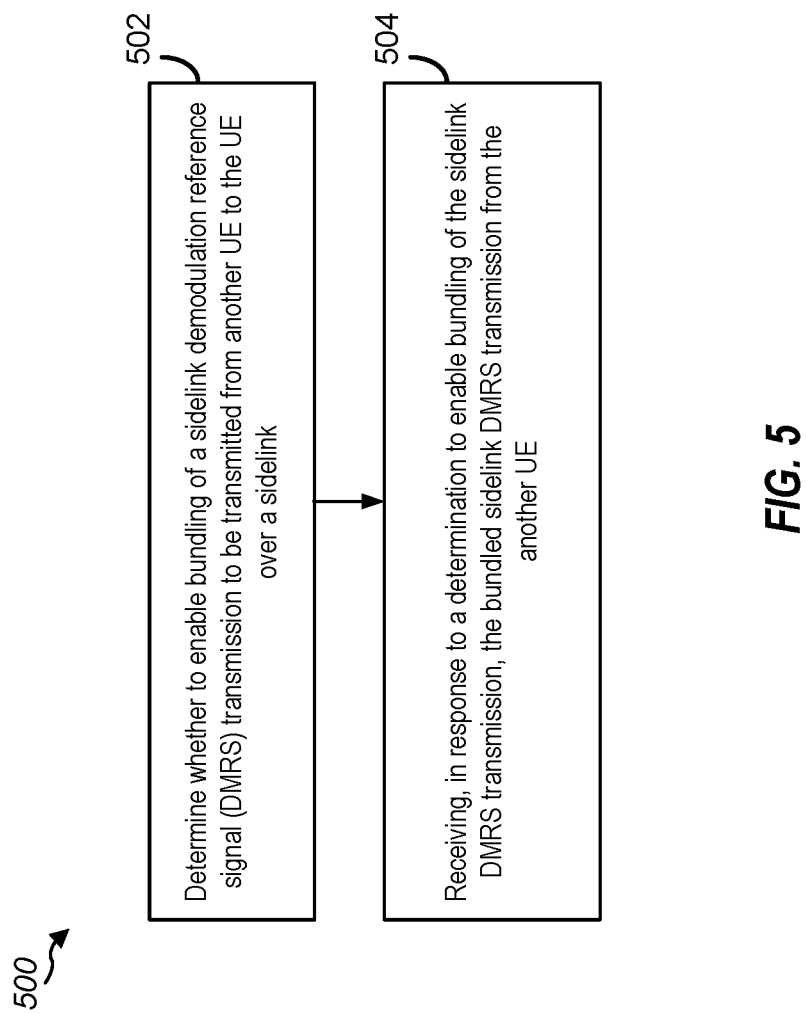
FIG. 5 is a flow diagram illustrating an example process that supports mechanisms for enabling sidelink DMRS bundling in a wireless communication system according to one or more aspects.

FIG. 5 is a flow diagram illustrating an example process 500 that provides for mechanisms for enabling sidelink DMRS bundling in a wireless communication system according to one or more aspects. Operations of process 500 may be performed by a UE, such as receiving UE 115b described above with reference to FIGS. 1-3. For example, example operations (also referred to as "blocks") of process 500 may enable UE 115 (e.g., UE 115 of FIG. 8) to support mechanisms for enabling sidelink DMRS bundling in a wireless communication system according to one or more aspects.

At block 502 of process 500, a UE (e.g., UE 115 and/or receiving UE 115a) determines whether to enable bundling of a sidelink DMRS transmission to be transmitted from another UE to the UE over a sidelink. In order to implement the functionality for such operations, UE 115, under control of controller/processor 280, executes DMRS bundling enabling logic 802, stored in memory 282. The functionality implemented through the execution environment of DMRS bundling enabling logic 802 allows for UE 115 to perform operations for determining whether to enable bundling of a sidelink DMRS transmission to be transmitted from another UE to the UE over a sidelink according to the various aspects herein. In aspects, UE 115 may perform operations to determine whether to enable bundling of a sidelink DMRS transmission to be transmitted from another UE to the UE over a sidelink according to operations and functionality as described above with reference to receiving UE 115b and as illustrated in FIG. 3.

At block 504 of process 500, UE 115 receives, in response to a determination to enable bundling of the sidelink DMRS transmission, the bundled sidelink DMRS transmission from the another UE. In order to implement the functionality for such operations, UE 115, under control of controller/processor 280, may receive the bundled sidelink DMRS transmission from the another UE via wireless radios 701a-r and antennas 252a-r. In aspects, UE 115 may perform operations to receive the bundled sidelink DMRS transmission from the another UE according to operations and functionality as described above with reference to receiving UE 115b and as illustrated in FIG. 3.

Figure 6:
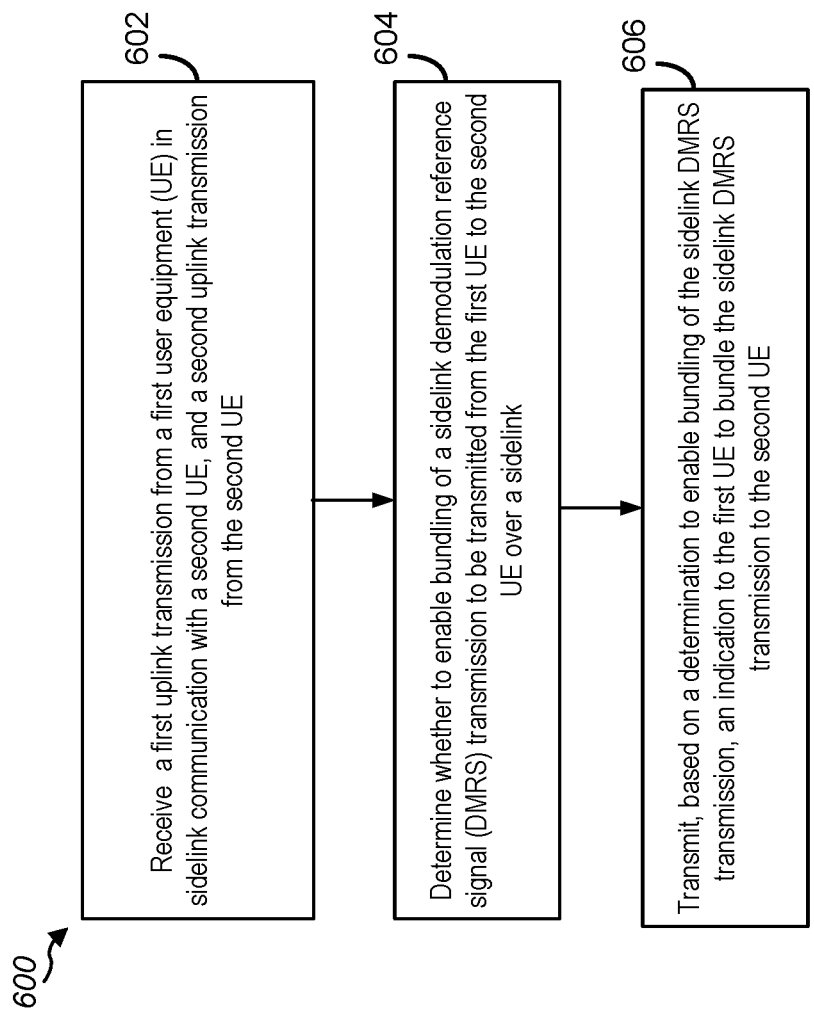
FIG. 6 is a flow diagram illustrating an example process that supports mechanisms for enabling sidelink DMRS bundling in a wireless communication system according to one or more aspects.
Figure 8:
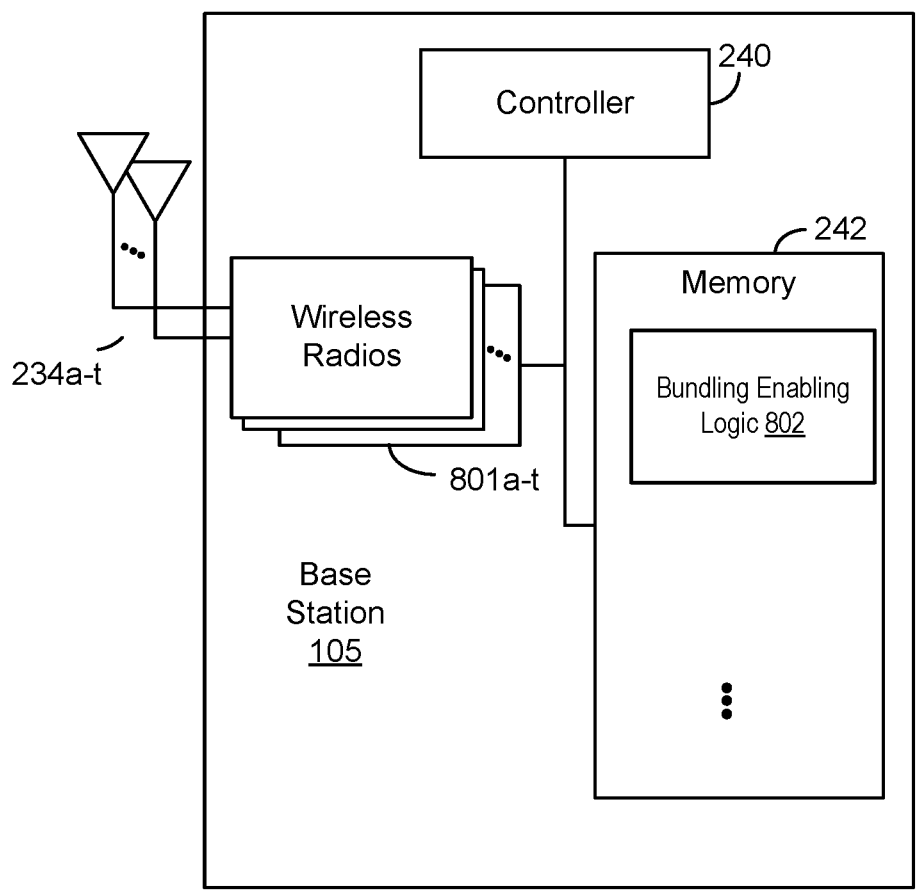
FIG. 8 is a block diagram of an example base station that supports mechanisms for enabling sidelink DMRS bundling in a wireless communication system according to one or more aspects.

FIG. 6 is a block diagram illustrating an example an example process 600 that provides for mechanisms for enabling sidelink DMRS bundling in a wireless communication system according to one or more aspects. Operations of process 600 may be performed by a base station, such as base station 105 described above with reference to FIGS. 1-3, or described with reference to FIG. 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 801a-t and antennas 234a-t. Wireless radios 801a-t includes various components and hardware, as illustrated in FIG. 2 for base station 105, including modulator/demodulators 232a-t, MIMO detector 236, receive processor 238, transmit processor 220, and TX MIMO processor 230.

At block 602 of process 600, a base station (e.g., base station 105) receives a first uplink transmission from a first UE in sidelink communication with a second UE, and a second uplink transmission from the second UE. In order to implement the functionality for such operations, the base station, under control of controller/processor 240, may receive the first uplink transmission from the first UE and the second uplink transmission from the second UE via wireless radios 801a-r and antennas 234a-t. In aspects, base station 105 may perform operations to receive the first uplink transmission from the first UE and the second uplink transmission from the second UE according to operations and functionality as described above with reference to base station 105 and as illustrated in FIG. 3.

At block 604 of process 600, base station 105 determines whether to enable bundling of a sidelink DMRS transmission to be transmitted from the first UE to the second UE over a sidelink. In order to implement the functionality for such operations, base station 105, under control of controller/processor 240, executes bundling enabling logic 802, stored in memory 242. The functionality implemented through the execution environment of bundling enabling logic 802 allows for base station 105 to perform operations to determine whether to enable bundling of a sidelink DMRS transmission to be transmitted from the first UE to the second UE over a sidelink according to the various aspects herein. In aspects, base station 105 may perform operations to determines whether to enable bundling of a sidelink DMRS transmission to be transmitted from the first UE to the second UE over a sidelink according to operations and functionality as described above with reference to base station 105 and as illustrated in FIG. 3.

At block 606 of process 600, base station 105 transmits, based on a determination to enable bundling of the sidelink DMRS transmission, an indication to the first UE to bundle the sidelink DMRS transmission to the second UE. In order to implement the functionality for such operations, the base station, under control of controller/processor 240, may transmit the indication to the first UE to bundle the sidelink DMRS transmission to the second UE via wireless radios 801a-r and antennas 234a-t. In aspects, base station 105 may perform operations to transmit the indication to the first UE to bundle the sidelink DMRS transmission to the second UE according to operations and functionality as described above with reference to base station 105 and as illustrated in FIG. 3.

In one or more aspects, techniques for supporting mechanisms for enabling sidelink DMRS bundling in a wireless communication system according to one or more aspects may include additional aspects, such as any single aspect or any combination of aspects described below or in connection with one or more other processes or devices described elsewhere herein. In a first aspect, supporting mechanisms for enabling sidelink DMRS bundling in a wireless communication system may include an apparatus configured to determine whether to enable bundling of a sidelink DMRS transmission to be transmitted to another UE over a sidelink, and to transmit, in response to a determination to enable bundling of the sidelink DMRS transmission, the bundled sidelink DMRS transmission to the another UE. Additionally, the apparatus may perform or operate according to one or more aspects as described below. In some implementations, the apparatus includes a wireless device, such as a UE (e.g., a transmitting UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, determining whether to enable bundling of the sidelink DMRS transmission includes determining, based on motion information associated with the UE, whether the UE is in high-mobility.

In a third aspect, alone or in combination with the second aspect, determining whether to enable bundling of the sidelink DMRS transmission includes determining, based on a determination that the UE is not in high-mobility, to enable bundling of the sidelink DMRS transmission.

In a fourth aspect, alone or in combination with one or more of the second aspect through the third aspect, determining whether to enable bundling of the sidelink DMRS transmission includes determining, based on a determination that the UE is in high-mobility, to forego enabling bundling of the sidelink DMRS transmission.

In a fifth aspect, alone or in combination with one or more of the first aspect through the fourth aspect, the techniques of the first aspect include transmitting, to the another UE, an indication that the sidelink DMRS transmission to be transmitted to the another UE is bundled when the UE determines to enable bundling of the sidelink DMRS transmission, and/or transmitting, to the another UE, an indication that the sidelink DMRS transmission to be transmitted to the another UE is not bundled when the UE determines to forego enabling bundling of the sidelink DMRS transmission.

In a sixth aspect, alone or in combination with one or more of the first aspect through the fifth aspect, determining whether to enable bundling of the sidelink DMRS transmission includes receiving, from the another UE, a sidelink transmission.

In a seventh aspect, alone or in combination with the sixth aspect, determining whether to enable bundling of the sidelink DMRS transmission includes determining whether the sidelink transmission is bundled.

In an eighth aspect, alone or in combination with one or more of the sixth aspect through the seventh aspect, determining whether to enable bundling of the sidelink DMRS transmission includes determining, based on a determination that the sidelink transmission is bundled, to enable bundling of the sidelink DMRS transmission.

In a ninth aspect, alone or in combination with one or more of the first aspect through the eighth aspect, a configuration of the sidelink DMRS transmission from the another UE is different from a configuration of the sidelink DMRS transmission transmitted from the UE to the another UE.

In a tenth aspect, alone or in combination with one or more of the first aspect through the ninth aspect, determining whether to enable bundling of the sidelink DMRS transmission includes receiving, from the another UE, a sidelink transmission.

In an eleventh aspect, alone or in combination with the tenth aspect, determining whether to enable bundling of the sidelink DMRS transmission includes determining whether the sidelink transmission is bundled.

In a twelfth aspect, alone or in combination with one or more of the tenth aspect through the eleventh aspect, determining whether to enable bundling of the sidelink DMRS transmission includes determining, based on a determination that the sidelink transmission is not bundled, to forego enabling bundling of the sidelink DMRS transmission.

In a thirteenth aspect, alone or in combination with one or more of the first aspect through the twelfth aspect, the techniques of the first aspect include transmitting, to a base station, an uplink DMRS transmission.

In a fourteenth aspect, alone or in combination with the thirteenth aspect, the techniques of the first aspect include determining to enable bundling of the sidelink DMRS transmission when the uplink DMRS transmission is bundled.

In a fifteenth aspect, alone or in combination with one or more of the thirteenth aspect through the fourteenth aspect, the techniques of the first aspect include determining to forego enabling bundling of the sidelink DMRS transmission when the uplink DMRS transmission is not bundled.

In a sixteenth aspect, alone or in combination with one or more of the first aspect through the fifteenth aspect, determining to enable bundling of the sidelink DMRS transmission when the uplink DMRS transmission is bundled includes defaulting to determining to enable bundling of the sidelink DMRS transmission without an indication from the base station to enable bundling of the sidelink transmission.

In a seventeenth aspect, alone or in combination with the sixteenth aspect, determining to enable bundling of the sidelink DMRS transmission when the uplink DMRS transmission is bundled includes receiving, from the base station, an indication to enable bundling of the sidelink DMRS transmission in a transmission grant.

In an eighteenth aspect, alone or in combination with one or more of the first aspect through the seventeenth aspect, determining whether to enable bundling of the sidelink DMRS transmission includes determining whether the sidelink DMRS transmission is to be transmitted over consecutive resources.

In a nineteenth aspect, alone or in combination with the eighteenth aspect, the techniques of the first aspect include determining, based on a determination that the sidelink DMRS transmission is to be transmitted over consecutive resources, to enable bundling of the sidelink DMRS transmission.

In a twentieth aspect, alone or in combination with one or more of the eighteenth aspect through the nineteenth aspect, the techniques of the first aspect include determining, based on a determination that the sidelink DMRS transmission is not to be transmitted over consecutive resources, to forego enabling bundling of the sidelink DMRS transmission.

In a twenty-first aspect, alone or in combination with one or more of the first aspect through the twentieth aspect, the consecutive resources may carry repetitions of a same transmission payload, and/or unique transmission payloads.

In a twenty-second aspect, techniques for supporting mechanisms for enabling sidelink DMRS bundling in a wireless communication system may include an apparatus configured to determine whether to enable bundling of a sidelink DMRS transmission to be transmitted from another UE to the UE over a sidelink, and to receive, in response to a determination to enable bundling of the sidelink DMRS transmission, the bundled sidelink DMRS transmission from the another UE. Additionally, the apparatus may perform or operate according to one or more aspects as described below. In some implementations, the apparatus includes a wireless device, such as a UE (e.g., a receiving UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-third aspect, alone or in combination with one or more of the twenty-second aspect through the twenty-second aspect, determining whether to enable bundling of the sidelink DMRS transmission includes determining, based on motion information associated with the UE, whether the UE is in high-mobility.

In a twenty-fourth aspect, alone or in combination with the twenty-third aspect, determining whether to enable bundling of the sidelink DMRS transmission includes determining, based on a determination that the UE is not in high-mobility, to enable bundling of the sidelink DMRS transmission.

In a twenty-fifth aspect, alone or in combination with one or more of the twenty-third aspect through the twenty-fourth aspect, determining whether to enable bundling of the sidelink DMRS transmission includes determining, based on a determination that the UE is in high-mobility, to forego enabling bundling of the sidelink DMRS transmission.

In a twenty-sixth aspect, alone or in combination with one or more of the twenty-second aspect through the twenty-fifth aspect, transmitting, to the another UE, an indication that the sidelink DMRS transmission to be transmitted to the another UE is to be bundled when the UE determines to enable bundling of the sidelink DMRS transmission.

In a twenty-seventh aspect, alone or in combination with the twenty-sixth aspect, transmitting, to the another UE, an indication that the sidelink DMRS transmission to be transmitted from the another UE is not to be bundled when the UE determines to forego enabling bundling of the sidelink DMRS transmission.

In a twenty-eighth aspect, alone or in combination with one or more of the twenty-second aspect through the twenty-seventh aspect, the indication that the sidelink DMRS transmission is not to be bundled includes transmitting the indication in a physical sidelink feedback channel (PSFCH) transmission to the another UE.

In a twenty-ninth aspect, alone or in combination with the twenty-eighth aspect, the indication that the sidelink DMRS transmission is not to be bundled includes transmitting the indication in an SCI message to be transmitted to the another UE.

In a thirtieth aspect, alone or in combination with one or more of the twenty-second aspect through the twenty-ninth aspect, the techniques of the twenty-second aspect include transmitting, to the another UE, a bundled sidelink transmission.

In a thirty-first aspect, alone or in combination with the thirtieth aspect, the techniques of the twenty-second aspect include receiving, from the another UE, the bundled sidelink DMRS transmission.

In a thirty-second aspect, alone or in combination with one or more of the thirtieth aspect through the thirty-first aspect, the another UE is configured to determine to bundle the sidelink DMRS transmission in response to receiving the bundled sidelink transmission.

In a thirty-third aspect, alone or in combination with one or more of the twenty-second aspect through the thirty-second aspect, the sidelink transmission is a sidelink DMRS transmission.

In a thirty-fourth aspect, alone or in combination with one or more of the twenty-second aspect through the thirty-third aspect, a configuration of the sidelink DMRS transmission from the UE to the another UE is different from a configuration of the sidelink DMRS transmission transmitted from the another UE to the UE.

In a thirty-fifth aspect, alone or in combination with one or more of the twenty-second aspect through the thirty-fourth aspect, the techniques of the twenty-second aspect include transmitting, to a base station, an uplink DMRS transmission.

In a thirty-sixth aspect, alone or in combination with the thirty-fifth aspect, the techniques of the twenty-second aspect include determining to enable bundling of the sidelink DMRS transmission when the uplink DMRS transmission is bundled.

In a thirty-seventh aspect, alone or in combination with one or more of the thirty-fifth aspect through the thirty-sixth aspect, the techniques of the twenty-second aspect include determining to forego enabling bundling of the sidelink DMRS transmission when the uplink DMRS transmission is not bundled.

In a thirty-eighth aspect, alone or in combination with one or more of the twenty-second aspect through the thirty-seventh aspect, determining to enable bundling of the sidelink DMRS transmission when the uplink DMRS transmission is bundled includes defaulting to determining to enable bundling of the sidelink DMRS transmission without an indication from the base station to enable bundling of the sidelink transmission.

In a thirty-ninth aspect, alone or in combination with the thirty-eighth aspect, determining to enable bundling of the sidelink DMRS transmission when the uplink DMRS transmission is bundled includes receiving, from the base station in a reception grant, an indication that the sidelink DMRS transmission from the another UE is to be bundled.

In a fortieth aspect, techniques for supporting mechanisms for enabling sidelink DMRS bundling in a wireless communication system may include an apparatus configured to receive a first uplink transmission from a first UE in sidelink communication with a second UE, and a second uplink transmission from the second UE, to determine whether to enable bundling of a sidelink DMRS transmission to be transmitted from the first UE to the second UE over a sidelink, and to transmit, based on a determination to enable bundling of the sidelink DMRS transmission, an indication to the first UE to bundle the sidelink DMRS transmission to the second UE. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a forty-first aspect, alone or in combination with one or more of the fortieth aspect through the fortieth aspect, determining whether to enable bundling of the sidelink DMRS transmission includes determining whether the first uplink transmission and the second uplink transmission are bundled.

In a forty-second aspect, alone or in combination with the forty-first aspect, determining to enable bundling of the sidelink DMRS transmission is based on a determination that the first uplink transmission and the second uplink transmission are bundled.

In a forty-third aspect, alone or in combination with one or more of the fortieth aspect through the forty-second aspect, the indication to the first UE to bundle the sidelink DMRS transmission to the second UE is transmitted in a transmission grant to the first UE.

In a forty-fourth aspect, alone or in combination with one or more of the fortieth aspect through the forty-third aspect, the techniques of the fortieth aspect include transmitting, based on a determination to enable bundling of the sidelink DMRS transmission, an indication to the second UE that the sidelink DMRS transmission from the first UE is to be bundled.

In a forty-fifth aspect, alone or in combination with one or more of the fortieth aspect through the forty-fourth aspect, the indication to the second UE that the sidelink DMRS transmission from the first UE is to be bundled is transmitted in a reception grant to the second UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
determining, by logic of the UE based on one or more aspects of a sidelink between the UE and another UE, whether to enable bundling of a sidelink demodulation reference signal (DMRS) transmission to be transmitted to the another UE over the sidelink, wherein determining whether to enable bundling is based on UE motion information associated with the sidelink, based on a determination of whether a sidelink transmission received from the another UE is bundled, or based on a determination of whether the sidelink DMRS transmission is to be transmitted over consecutive resources;
transmitting, in response to a determination to enable bundling of the sidelink DMRS transmission, a bundled sidelink DMRS transmission to the another UE, wherein the bundled sidelink DMRS transmission includes sidelink DMRS transmissions over a sidelink DMRS bundling window comprising a plurality of slots; and transmitting a phase jump reference signal for estimating a phase jump over the DMRS bundling window by the another UE.

2. The method of claim 1, wherein determining whether to enable bundling of the sidelink DMRS transmission includes:

determining, based on the UE motion information associated with the sidelink, whether the UE is in high-mobility, and further includes one or more of:

determining, based on a determination that the UE is not in high-mobility, to enable bundling of the sidelink DMRS transmission; or determining, based on a determination that the UE is in high-mobility, to forego enabling bundling of the sidelink DMRS transmission.

3. The method if claim 2, further comprising one or more of:

transmitting, to the another UE, an indication that the sidelink DMRS transmission to be transmitted to the another UE is bundled when the UE determines to enable bundling of the sidelink DMRS transmission; or transmitting, to the another UE, an indication that the sidelink DMRS transmission to be transmitted to the another UE is not bundled when the UE determines to forego enabling bundling of the sidelink DMRS transmission.

4. The method of claim 1, wherein determining whether to enable bundling of the sidelink DMRS transmission includes:

receiving, from the another UE, the sidelink transmission;
determining whether the sidelink transmission is bundled; and
determining based on a determination that the sidelink transmission is bundled, to enable bundling of the sidelink DMRS transmission.

5. The method of claim 4, wherein a configuration of the sidelink DMRS transmission from the another UE is different from a configuration of the sidelink DMRS transmission transmitted from the UE to the another UE.

6. The method of claim 1, wherein determining whether to enable bundling of the sidelink DMRS transmission includes:

receiving, from the another UE, the sidelink transmission;
determining whether the sidelink transmission is bundled; and
determining, based on a determination that the sidelink transmission is not bundled, to forego enabling bundling of the sidelink DMRS transmission.

7. The method of claim 1, wherein determining whether to enable bundling of the sidelink DMRS transmission includes:

determining whether the sidelink DMRS transmission is to be transmitted over consecutive resources, and further comprising one or more of:

determining, based on a determination that the sidelink DMRS transmission is to be transmitted over consecutive resources, to enable bundling of the sidelink DMRS transmission; or determining, based on a determination that the sidelink DMRS transmission is not to be transmitted over consecutive resources, to forego enabling bundling of the sidelink DMRS transmission.

8. The method of claim 7, wherein the consecutive resources may carry one of:

repetitions of a same transmission payload; and
unique transmission payloads.

9. A method of wireless communication performed by a base station, the method comprising:

receiving a first uplink transmission from a first user equipment (UE) in sidelink communication with a second UE, and a second uplink transmission from the second UE;

determining whether to enable bundling of a sidelink demodulation reference signal (DMRS) transmission to be transmitted from the first UE to the second UE over a sidelink, wherein determining whether to enable bundling of the sidelink DMRS transmission includes determining whether the first uplink transmission and the second uplink transmission are bundled, wherein determining to enable bundling of the sidelink DMRS transmission is based on a determination that the first uplink transmission and the second uplink transmission are bundled; and transmitting, based on a determination to enable bundling of the sidelink DMRS transmission, an indication to the first UE to bundle the sidelink DMRS transmission to the second UE.

10. The method of claim 9, wherein the indication to the first UE to bundle the sidelink DMRS transmission to the second UE is transmitted in a transmission grant to the first UE.

11. The method of claim 9, further comprising:

transmitting, based on a determination to enable bundling of the sidelink DMRS transmission, an indication to the second UE that the sidelink DMRS transmission from the first UE is to be bundled.

12. The method of claim 11, wherein the indication to the second UE that the sidelink DMRS transmission from the first UE is to be bundled is transmitted in a reception grant to the second UE.

13. A user equipment (UE), comprising:

a processor; and
a memory coupled with the processor, wherein the memory includes instructions executable by the processor to cause the UE to:

determine, by logic of the UE based on one or more aspects of a sidelink between the UE and another UE, whether to enable bundling of a sidelink demodulation reference signal (DMRS) transmission to be transmitted to the another UE over the sidelink, wherein the processor is configured to cause the UE to determine whether to enable bundling based on UE motion information associated with the sidelink, based on a determination of whether a sidelink transmission received from the another UE is bundled, or based on a determination of whether the sidelink DMRS transmission is to be transmitted over consecutive resources;

transmit, in response to a determination to enable bundling of the sidelink DMRS transmission, a bundled sidelink DMRS transmission to the another UE, wherein the bundled sidelink DMRS transmission includes sidelink DMRS transmissions over a sidelink DMRS bundling window comprising a plurality of slots; and transmit a phase jump reference signal for estimating a phase jump over the sidelink DMRS bundling window by the another UE.

14. The UE of claim 13, wherein the instructions executable by the processor to cause the UE to determine whether to enable bundling of the sidelink DMRS transmission comprise instructions executable by the processor to cause the UE to:
- determine, based on the UE motion information associated with the sidelink, whether the UE is in high-mobility, and the instructions executable by the processor to cause the UE to determine whether to enable bundling of the sidelink DMRS transmission further comprise instructions executable by the processor to cause the UE to:
- determine, based on a determination that the UE is not in high-mobility, to enable bundling of the sidelink DMRS transmission; or
- determine, based on a determination that the UE is in high-mobility, to forego enabling bundling of the sidelink DMRS transmission.

15. The UE of claim 14, wherein the memory further includes instructions executable by the processor to cause the UE to one or more of:
- transmit, to the another UE, an indication that the sidelink DMRS transmission to be transmitted to the another UE is bundled when the UE determines to enable bundling of the sidelink DMRS transmission; or
- transmit, to the another UE, an indication that the sidelink DMRS transmission to be transmitted to the another UE is not bundled when the UE determines to forego enabling bundling of the sidelink DMRS transmission.

16. The UE of claim 13, wherein the instructions executable by the processor to cause the UE to determine whether to enable bundling of the sidelink DMRS transmission comprise instructions executable by the processor to cause the UE to:
- receive, from the another UE, the sidelink transmission;
- determine whether the sidelink transmission is bundled; and
- determine, based on a determination that the sidelink transmission is bundled, to enable bundling of the sidelink DMRS transmission.

17. The UE of claim 13, wherein the instructions executable by the processor to cause the UE to determine whether to enable bundling of the sidelink DMRS transmission comprise instructions executable by the processor to cause the UE to determine whether the sidelink DMRS transmission is to be transmitted over consecutive resources, and wherein the memory further includes instructions executable by the processor to cause the UE to one or more of:
- determine, based on a determination that the sidelink DMRS transmission is to be transmitted over consecutive resources, to enable bundling of the sidelink DMRS transmission; or
- determine, based on a determination that the sidelink DMRS transmission is not to be transmitted over consecutive resources, to forego enabling bundling of the sidelink DMRS transmission.

* * * * *